US007552590B2

(12) United States Patent
Drevs et al.

(10) Patent No.: US 7,552,590 B2
(45) Date of Patent: Jun. 30, 2009

(54) TUBE-TYPE VORTEX REDUCER

(75) Inventors: Steffen Drevs, Berlin (DE); Sacha Pichel, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 299 days.

(21) Appl. No.: 11/053,944

(22) Filed: Feb. 10, 2005

(65) Prior Publication Data

US 2005/0172640 A1 Aug. 11, 2005

(30) Foreign Application Priority Data

Feb. 11, 2004 (DE) ...................... 10 2004 006 775

(51) Int. Cl.
*F02C 7/12* (2006.01)
*F01D 5/08* (2006.01)

(52) U.S. Cl. ........................................ 60/785; 415/115

(58) Field of Classification Search .................. 60/782, 60/785; 415/115

See application file for complete search history.

(56) References Cited

U.S. PATENT DOCUMENTS

| | | | | |
|---|---|---|---|---|
| 3,398,881 | A * | 8/1968 | Greenberg et al. | 415/144 |
| 4,844,694 | A * | 7/1989 | Naudet | 416/198 A |
| 5,267,832 | A * | 12/1993 | Johnson et al. | 415/115 |
| 5,853,285 | A * | 12/1998 | Miller et al. | 415/115 |
| 7,086,830 | B2 * | 8/2006 | Fitzgerald et al. | 415/115 |
| 2003/0101730 | A1 * | 6/2003 | Hein et al. | 60/785 |

* cited by examiner

*Primary Examiner*—Ted Kim
(74) *Attorney, Agent, or Firm*—Timothy J. Klima

(57) ABSTRACT

A tube-type vortex reducer for the conduction of cooling air in a compressor (1) of a gas turbine, having radial secondary air tubes (2) arranged in a disk interspace (5) and attached to a compressor disk (3) at their radially outward end sections (33). Radially inward sections (30) of the secondary air tubes (2) are located fittingly and radially outward in recesses (31) of locating pads (32) of a compressor disk (3), and the radially outward sections (33) of the secondary air tubes (2) are carried radially shiftable in recesses (34) of locating arms (35) of the compressor disk (3) and are secured against radially inward movement by locking elements (36).

20 Claims, 5 Drawing Sheets

TUBE-TYPE VORTEX REDUCER

This application claims priority to German Patent Application DE102004006775.9 filed Feb. 11, 2004, the entirety of which is incorporated by reference herein.

BACKGROUND OF THE INVENTION

This invention relates to a tube-type vortex reducer. More particularly, the present invention relates to a vortex reducer for the conduction of cooling air in a compressor of a gas turbine, with radial secondary air tubes being arranged in a disk interspace and attached to a compressor disk at their radially outward end sections.

In the state of the art, designs are known in which the secondary air tubes are fitted to corresponding locations on the disks by pressing, riveting, screwing, snapping or forging processes. These designs are disadvantageous in that adequate working space must be provided to enable the secondary air tubes to be installed with suitable tools. Therefore, the secondary air chamber, through which the secondary air enters the secondary air tubes, must be given a relatively large cross-section. This involves high manufacturing costs. Furthermore, the compressor disk may be damaged during the installation of the secondary air tubes. This results in quite a considerable cost risk. The special tools required also lead to a significant cost increase.

An arrangement is known from Patent Specification EP 0 541 250 A1 in which the secondary air tubes are located at their radially inward end section only. This design requires high manufacturing investment and a multitude of additional components, this resulting in an increase of the total weight. Furthermore, the free radially outward end sections of the secondary air tubes are liable to produce vibration problems.

BRIEF SUMMARY OF THE INVENTION

In a broad aspect, the present invention provides a tube-type vortex reducer of the type described above which, while being simply designed, is easily usable, dependable in operation, and can be produced cost-effectively.

It is a particular object of the present invention to provide solution to the above problems by a combination of the features described herein. Further advantageous embodiments of the present invention will be apparent from the description below.

The present invention, therefore, provides for a secondary air tube, the radially inward section of which is located fittingly and radially outwards in a recess of a locating pad of a compressor disk. Thus, the secondary air tube is fittingly retained, i.e. play-free, in the recess at its radially inward end section or bottom area. In addition, this locating arrangement takes up the outward force occurring during the rotation of the compressor disk, thus ensuring the safe fixation of the secondary air tube.

The present invention further provides for a secondary air tube, the radially outward section of which is carried radially shiftable in a recess of a locating arm of a compressor disk and is secured against radially inward movement by means of a locking element. Thus, the radially outward section is located such that changes in length due to temperature differences are compensated. Furthermore, this type of arrangement avoids a double-fit situation. The locking element in accordance with the inventive arrangement precludes the secondary air tube from sliding radially inwards when the compressor disk or the gas turbine, respectively, is at rest. Thus, the locking element is only effective when the compressor disk is at rest, while it is not effective during rotation of the compressor disk. Accordingly, wider tolerances are acceptable for the accuracy of fit and assembly of the locking element.

In an advantageous development of the present invention, the secondary air tubes are provided with a ring shoulder at their radially inward section, this ring shoulder resting against the respective locating pad radially from the inside. This provides for good force introduction and ensures precise positioning.

In order to enable the locking element to act upon the secondary air tube, the latter is provided with an annular retaining shoulder at its radially outward section.

According to the present invention, the locking element is attached by means of a bolt connecting both compressor disks. Thus, additional fasteners for the locking element are not required.

The locking element preferably comprises a retaining leg locating against the retaining shoulder of the secondary air tube. Furthermore, the locking element favorably comprises a deformable locking leg to hold the bolt, this allowing the bolt to be pre-assembled or preventing the bolt from detaching from the locking element under repair conditions.

The mating surfaces between the secondary air tube and the compressor disk can be either semi-spherical or flat. If semi-spherical, the mating surface of the compressor disk can be produced by a simple and inexpensive turning-machining operation. If flat or plain, a corresponding, depressed mating surface can be provided on the compressor disk.

The design according to the present invention enables the size of the disk interspace to be reduced and assembly and/or disassembly to be facilitated. Generally, an increased stiffness of the rotor is thus obtained. Also the vibration characteristics are considerably improved.

A further advantage lies in the easier assembly and disassembly both, during manufacture and maintenance of the gas turbine. The reduced number of components and operations results in considerable cost savings. Furthermore, the inventive arrangement enables the size of the disk interspace to be optimized, thus improving aerodynamics while increasing total strength.

A further advantage lies in the fact that the secondary air tubes are easily exchangeable for equilibrating or balancing the compressor.

BRIEF DESCRIPTION OF THE DRAWINGS

The present invention is more fully described in the light of the accompanying drawings showing a preferred embodiment. In the drawings, FIG. 1 (Prior Art) is a schematic partial view of an embodiment according to the state of the art, FIG. 2 (Prior Art) is a view, analogically to FIG. 1, of a further embodiment according to the state of the art.

DETAILED DESCRIPTION OF THE INVENTION

This detailed description should be read in conjunction with the summary section above, which section is incorporated by reference herein.

Figure 7:
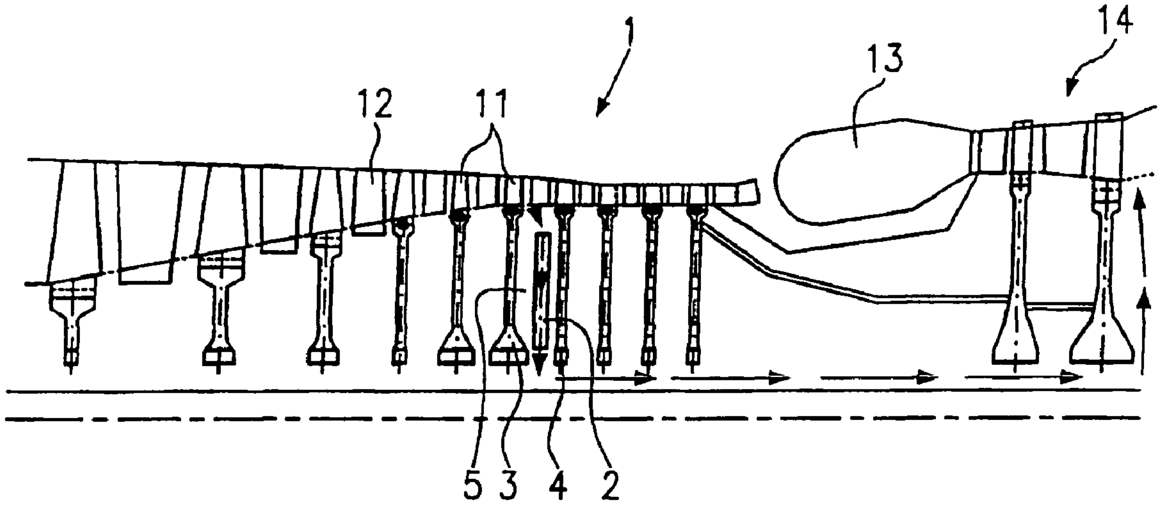
FIG. 7 is a simplified sectional view of a portion of an inventive gas turbine, using the present invention.

FIG. 7 shows a partial sectional view of an inventive gas turbine. Reference numeral 1 shows a compressor comprising rotor blades 11 and stator vanes 12. The rotor blades 11 are fixed to the compressor disks 3 or 4, respectively. These form a disk interspace 5 in which several, radial secondary air tubes 2 are arranged. Reference numeral 13 indicates a combustion chamber, while reference numeral 14 designates a turbine in schematic representation. The arrows schematically indicate the route of the secondary air flow.

Figure 1:
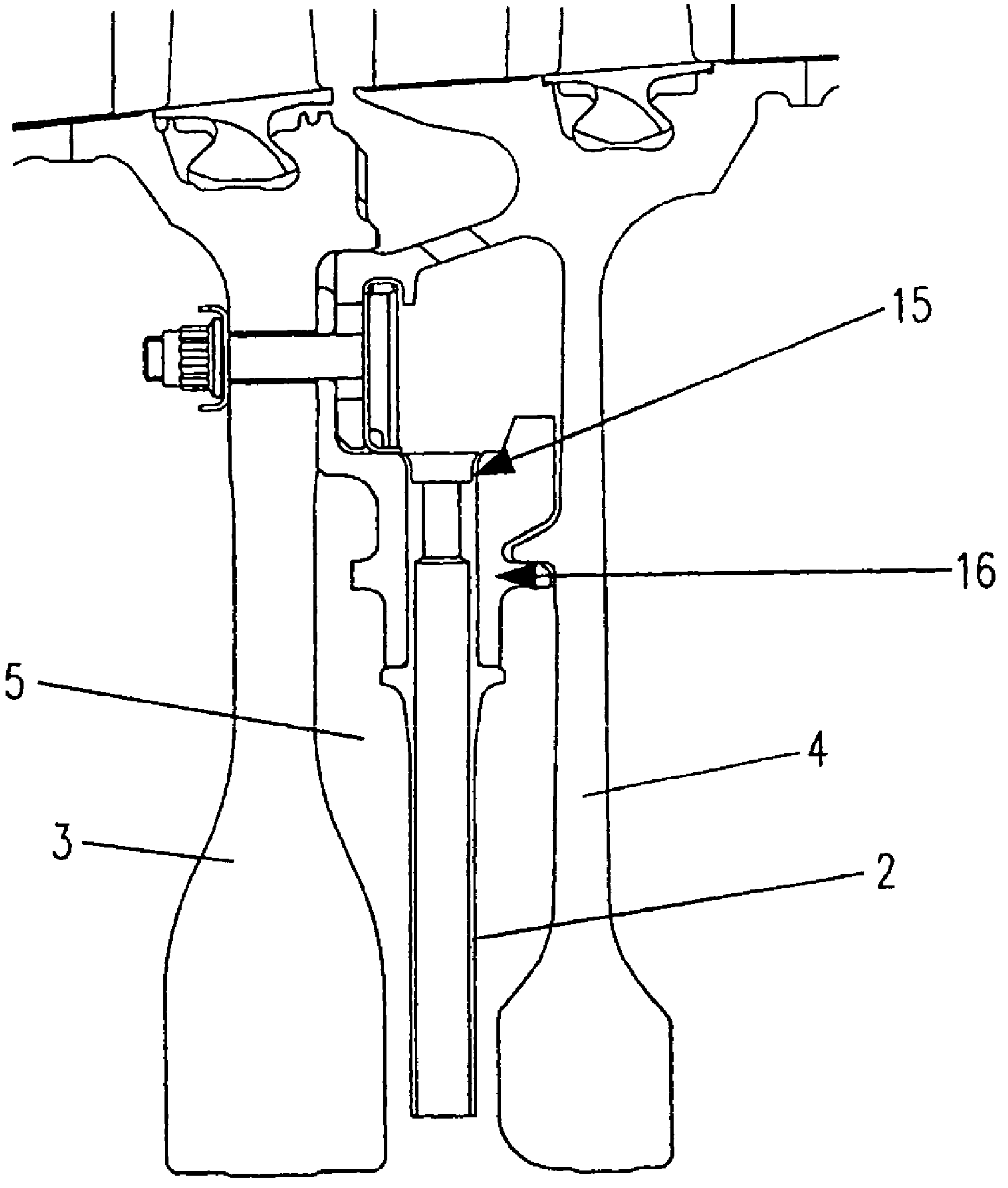
Fig. 1 Prior Art
Figure 2:
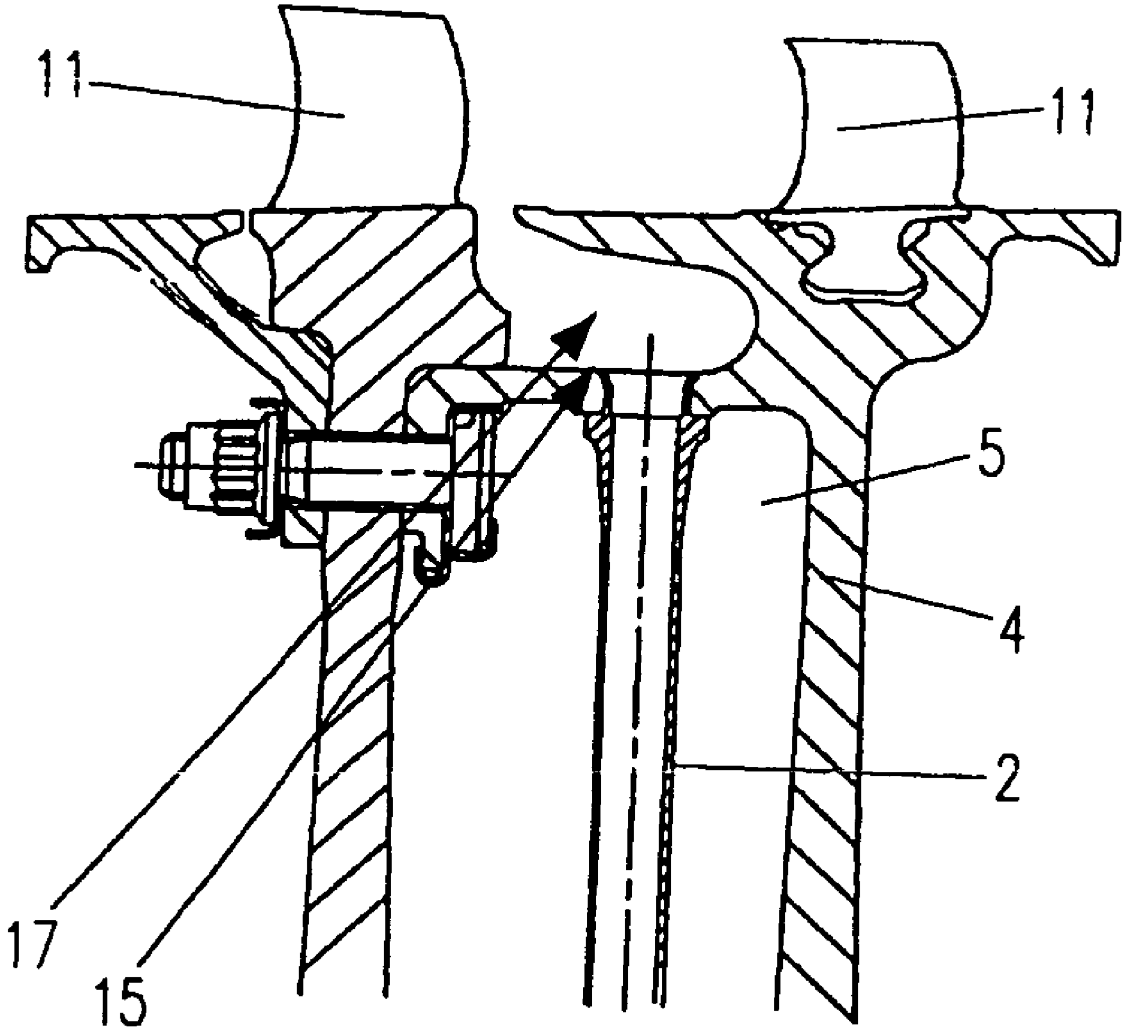
Fig. 2 Prior Art

FIGS. 1 and 2 show embodiments according to the state of the art. Obviously, the end sections of the secondary air tubes are riveted, as indicated by the reference numeral 15. Reference numeral 16 designates an additional carrier disk which represents an additional volume element and is fitted in the disk interspace 5.

FIG. 2 shows a similar embodiment, with a riveted joint again being indicated by the reference numeral 15. As becomes apparent, a very large secondary air chamber 17 must be provided to allow the riveting tool to be introduced.

Figure 3:
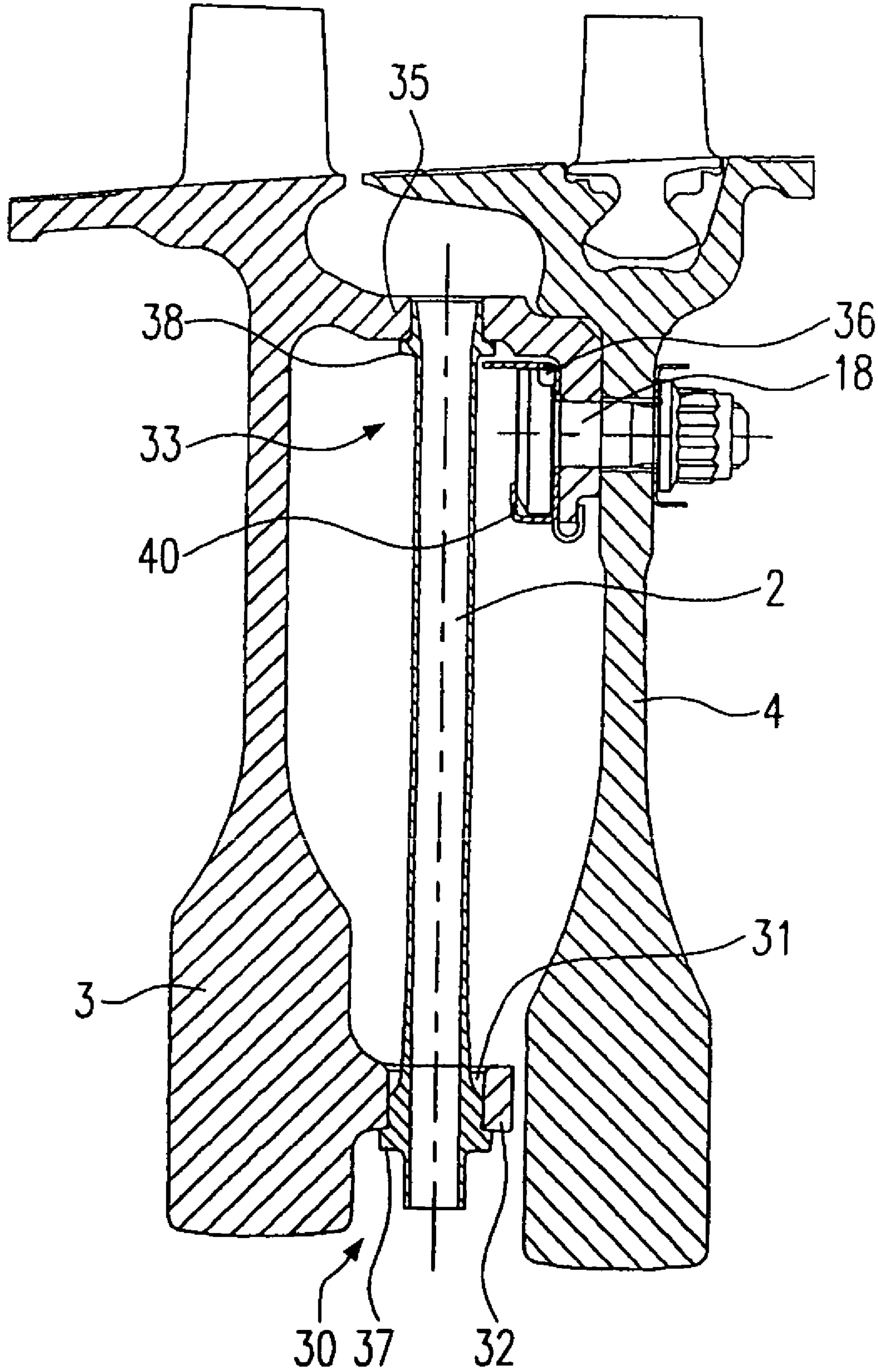
FIG. 3 is a simplified sectional view of an embodiment according to the present invention.

FIG. 3 shows a sectional view of an embodiment according to the present invention in the assembled state. As can be seen, the secondary air tube 2 is provided with a ring shoulder 37 at its radially inward section facing the rotary axis of the gas turbine, this ring shoulder 37 being provided with a radially outward mating surface not further designated herein. This mating surface rests against a locating pad 32 which is integral with the compressor disk 3. Accordingly, the secondary air tube 2 can be passed through a recess 31 of the locating pad 32.

Figure 4:
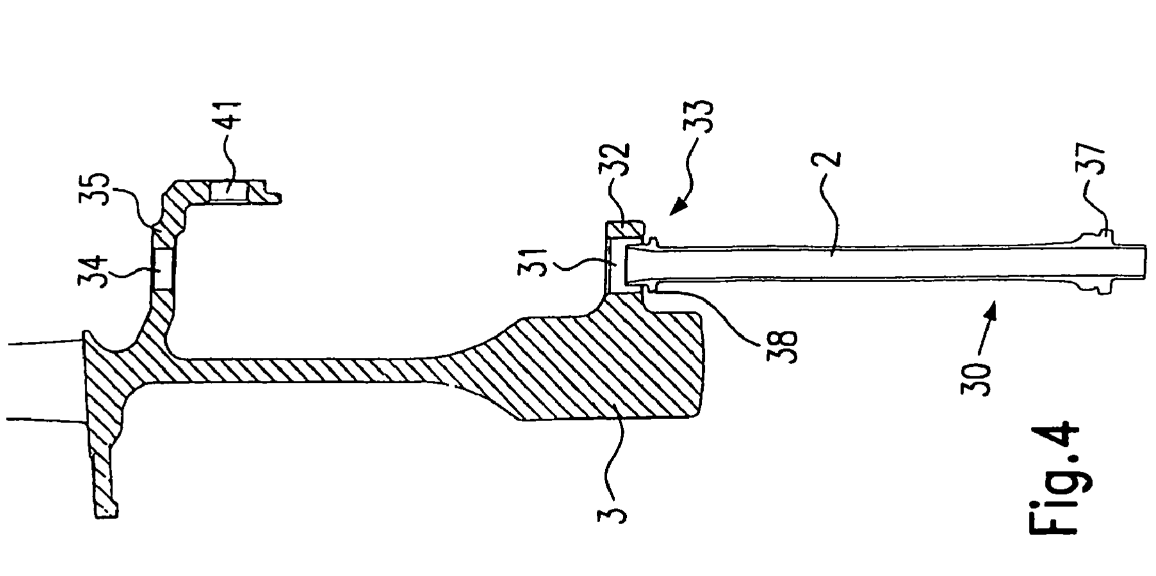
FIGS. 4 to 6 show the assembly sequence of the embodiment of FIG. 3.

At the radially outward end section, the secondary air tube 2 is provided with a retaining shoulder 38. Since the outer diameter of the retaining shoulder 38 is smaller than the inner diameter of the recess 31, the secondary air tube can be inserted from the inside, as shown in FIG. 4. In the assembled state, the retaining shoulder 38 rests against a locating arm 35 of the compressor disk 3 with clearance, thus avoiding a double-fit situation. The inner diameter of a recess 34 of the locating arm 35 is preferably selected such that the end section of the secondary air tube 2 is longitudinally moveable, but is retained in vibration-free condition.

For connection of the locating arm 35 of the compressor disk 3 with the compressor disk 4, a threaded bolt is provided which also serves the fixation of a locking element 36. It prevents a radially outward section 33 of the secondary air tube 2 from slipping radially inwards when the compressor 1 is at rest. The radially outward force occurring during operation of the compressor 1 is taken up at a radially inward section 30 of the secondary air tube 2 in the manner described.

The locking element 36 includes a longer retaining leg 39 (see FIGS. 5 and 6), which rests against, or has a certain amount of clearance with, the retaining shoulder 38. Also, the locking element 36 is provided with a locking leg 40 (see FIGS. 5 and 6) which is deformable upon assembly to hold the head of the threaded bolt 18.

Figure 5:
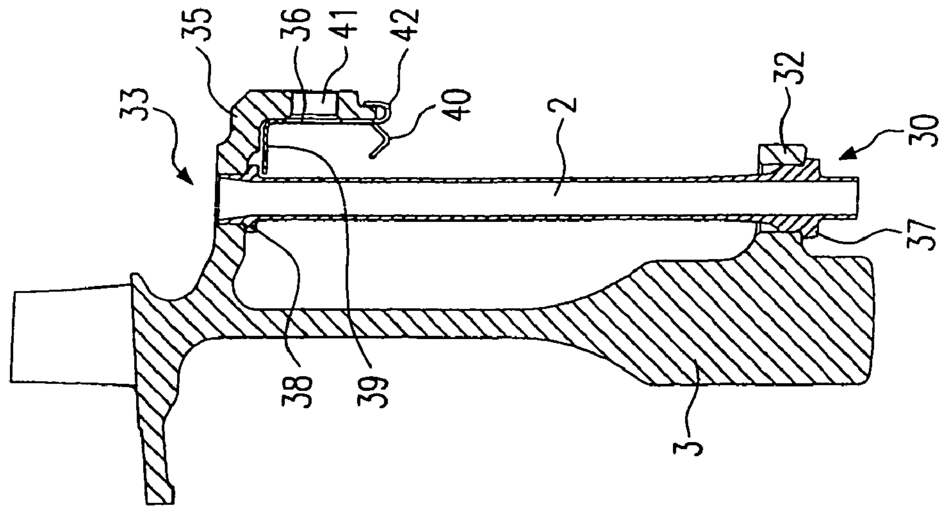
Figure 6:
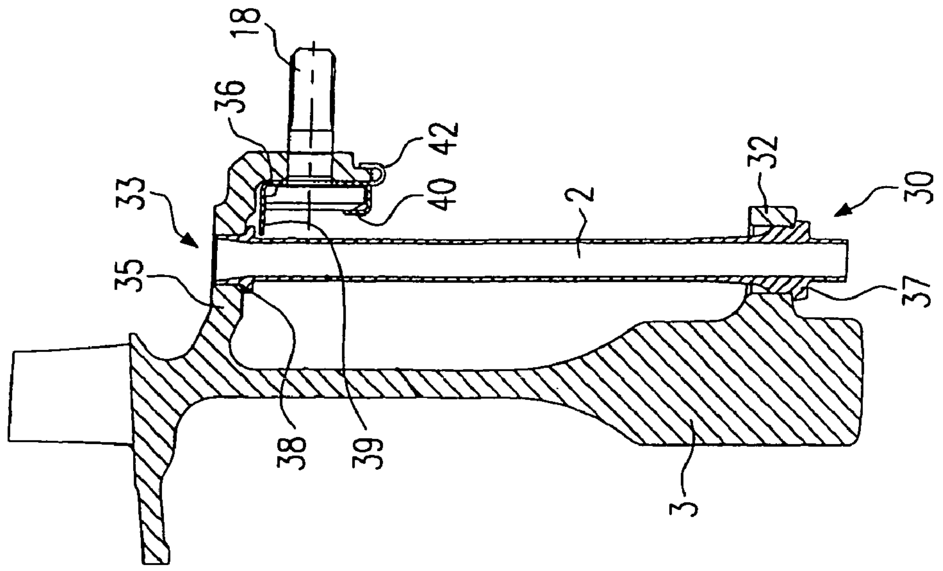

FIGS. 4 to 6 show the sequence of assembly. FIG. 4 illustrates that the secondary air tube 2 is initially passed from the inside to the outside through the locating pad 32. Subsequently, the radially outward section 33 is introduced into the recess 34, while the radially inward section 30 is fittingly inserted into the recess 31, with the ring shoulder 37 fittingly mating with the mating surface of the locating pad 32.

In the subsequent assembly step shown in FIG. 5, the locking element 36 is pre-assembled. Obviously, a recess 41 of the locating arm 35 is arranged circumferentially offset to the secondary air tube 2 to enable the bolt 18 to be inserted. For simplification, this circumferential offset is not detailed in FIGS. 5 and 6. The locking element 36 is pre-assembled and is held on the locating arm 35 by means of a clamp 42 which is integral with the locking element 36. Subsequently, the bolt 18 is inserted (FIG. 6). The locking leg 40 is deformed to fix the head of the bolt 18. Then, the bolted connection to the adjacent compressor disk 4 can be made.

LIST OF REFERENCE NUMERALS

1 Compressor
2 Secondary air tube
3, 4 Compressor disk
5 Disk interspace
11 Rotor blade
12 Stator vane
13 Combustion chamber
14 Turbine
15 Riveted joint
16 Carrier disk
17 Secondary air chamber
18 Bolt
30 Radially inward section
31 Recess
32 Locating pad
33 Radially outward section
34 Recess
35 Locating arm
36 Locking element
37 Ring shoulder
38 Retaining shoulder
39 Retaining leg
40 Locking leg
41 Recess
42 Clamp

What is claimed is:

1. A tube-type vortex reducer for the conduction of cooling air in a compressor of a gas turbine, including radial secondary air tubes arranged in a disk interspace and attached to a compressor disk at their radially outward end sections, radially inward sections of the secondary air tubes being located fittingly and radially outward in recesses of locating pads of the compressor disk, the radially outward sections of the secondary air tubes being carried radially shiftable in recesses of locating arms of the compressor disk and secured against radially inward movement by locking elements;

wherein each secondary air tube includes an annular retaining shoulder positioned between the locating pad and the locating arm proximal to a radially inwardly facing surface of the locating arm to limit radially outwardly movement of the secondary air tube and the respective locking element engages a radially inwardly facing annular surface of the annular retaining shoulder to secure the air tube against radially inward movement.

2. A vortex reducer in accordance with claim 1, wherein the secondary air tubes are provided with ring shoulders at their radially inward sections, which rest against the locating pads radially from the inside.

3. A vortex reducer in accordance with claim 2, wherein each locking element is attached by a bolt connecting to a separate adjacent compressor disk.

4. A vortex reducer in accordance with claim 3, wherein the locking element comprises a retaining leg locating against the radially inwardly facing surface of the annular retaining shoulder.

5. A vortex reducer in accordance wit claim 4, wherein the locking element comprises a deformable locking leg to hold the bolt.

6. A vortex reducer in accordance with claim 5, wherein mating surfaces between the secondary air tubes and the compressor disk are semi-spherical.

7. A vortex reducer in accordance with claim 5, wherein mating surfaces between the secondary air tube and the compressor disk are flat.

8. A vortex reducer in accordance with claim 1, wherein each locking element is attached by a bolt connecting to a separate adjacent compressor disk.

9. A vortex reducer in accordance with claim 1, wherein the locking element comprises a retaining leg locating against the radially inwardly facing surface of the annular retaining shoulder.

10. A vortex reducer in accordance with claim 8, wherein the locking element comprises a deformable locking leg to hold the bolt.

11. A vortex reducer in accordance with claim 1, wherein mating surfaces between the secondary air tubes and the compressor disk are semi-spherical.

12. A vortex reducer in accordance with claim 1, wherein mating surfaces between the secondary air tube and the compressor disk are flat.

13. A tube-type vortex reducer for the conduction of cooling air in a compressor of a gas turbine, comprising:

a plurality of radial secondary air tubes arranged in a disk interspace, wherein, a radially inward section of each air tube is radially received in a recess of a locating pad of a compressor disk, a radially outward section of each air tube is radially outwardly received in a recess of a locating arm of the compressor disk and secured against radially inward movement by a locking element;

wherein each secondary air tube includes an annular shoulder which is positioned between the locating pad and the locating arm proximal to a radially inwardly facing surface of the locating arm to limit radially outwardly movement of the secondary air tube and the locking element engages a radially inwardly facing annular surface of the annular shoulder to secure the air tube against radially inward movement, the locking element secured in place by a connection to a separate adjacent compressor disk.

14. A vortex reducer in accordance with claim 13, wherein each secondary air tube includes an annular shoulder which engages a radially inwardly facing surface of the locating pad to limit radially outwardly movement of the secondary air tube.

15. A vortex reducer in accordance with claim 14, wherein the locking element comprises a retaining leg locating against radially inwardly facing annular surface of the annular shoulder.

16. A vortex reducer in accordance with claim 13, wherein the locking element is secured in place by a bolt connecting to the separate adjacent compressor disk and the locking element comprises a deformable locking leg to hold the bolt.

17. A vortex reducer in accordance with claim 13, wherein each locking element is directly attached to the locating arm which connects to the separate adjacent compressor disk.

18. A tube-type vortex reducer for the conduction of cooling air in a compressor of a gas turbine, including radial secondary air tubes arranged in a disk interspace and attached to a compressor disk at their radially outward end sections, radially inward sections of the secondary air tubes being located fittingly and radially outward in recesses of locating pads of the compressor disk, the radially outward sections of the secondary air tubes being carried radially shiftable in recesses of locating arms of the compressor disk and secured against radially inward movement by locking elements, wherein each locking element is attached by a bolt connecting to a separate adjacent compressor disk.

19. A vortex reducer in accordance with claim 18, wherein each locking element comprises a retaining leg locating against a radially inwardly facing annular surface of an annular retaining shoulder of the respective secondary air tube.

20. A vortex reducer in accordance with claim 19, wherein each locking element comprises a deformable locking leg to hold the bolt.

* * * * *